March 27, 1928. 1,664,024
J. DE KONING
GRINDING MACHINE
Filed Aug. 20, 1924  10 Sheets-Sheet 3

Inventor
Jacob De Koning
By Cyrus W. Rice
Attorney

Witness:

March 27, 1928.　　　　J. DE KONING　　　　1,664,024
GRINDING MACHINE
Filed Aug. 20, 1924　　　10 Sheets-Sheet 4
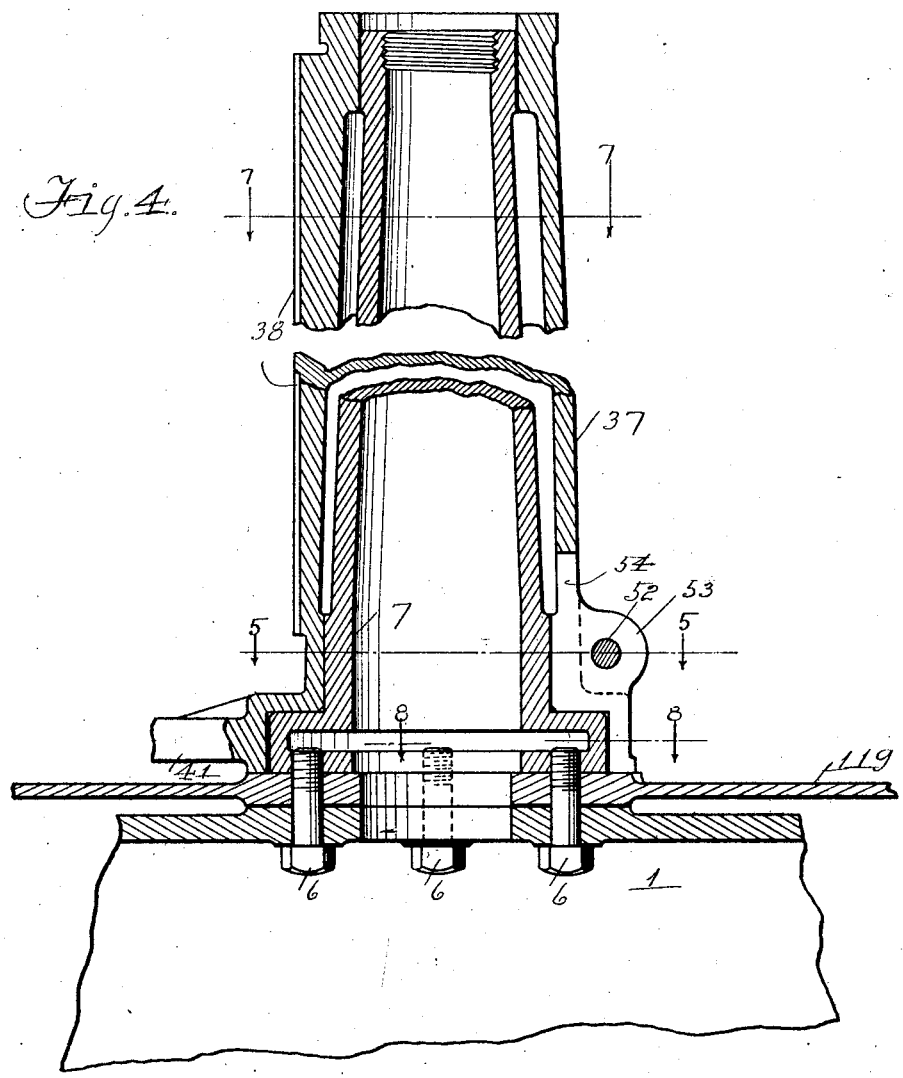

March 27, 1928.
J. DE KONING
GRINDING MACHINE
1,664,024
Filed Aug. 20, 1924    10 Sheets-Sheet 5
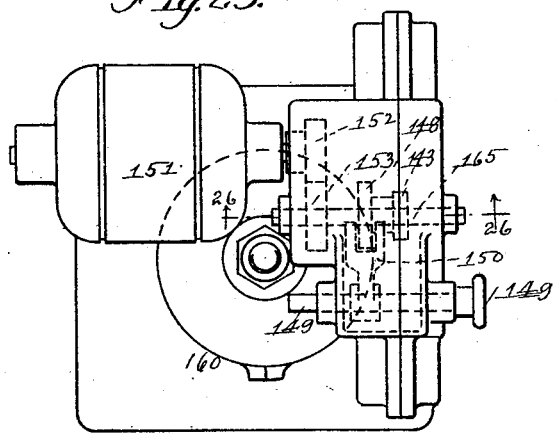
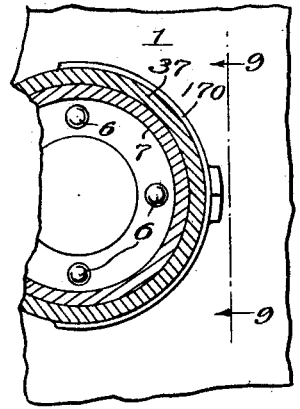
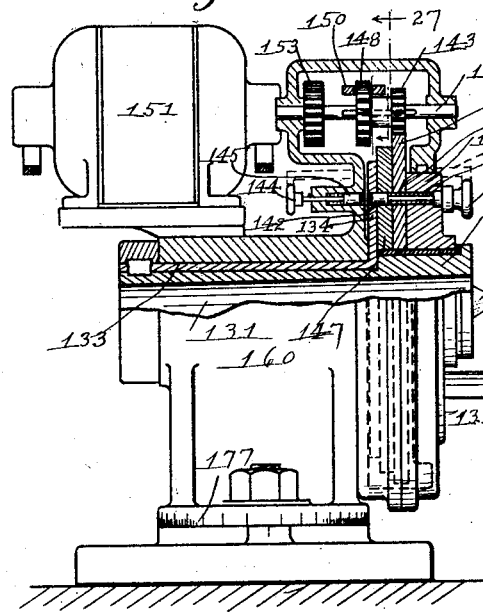
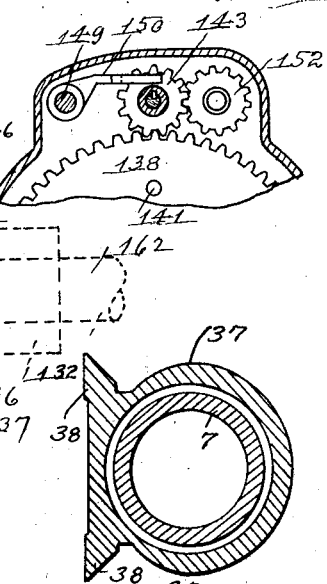
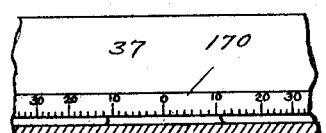
Inventor
Jacob De Koning
By Cyrus W. Rice
Attorney

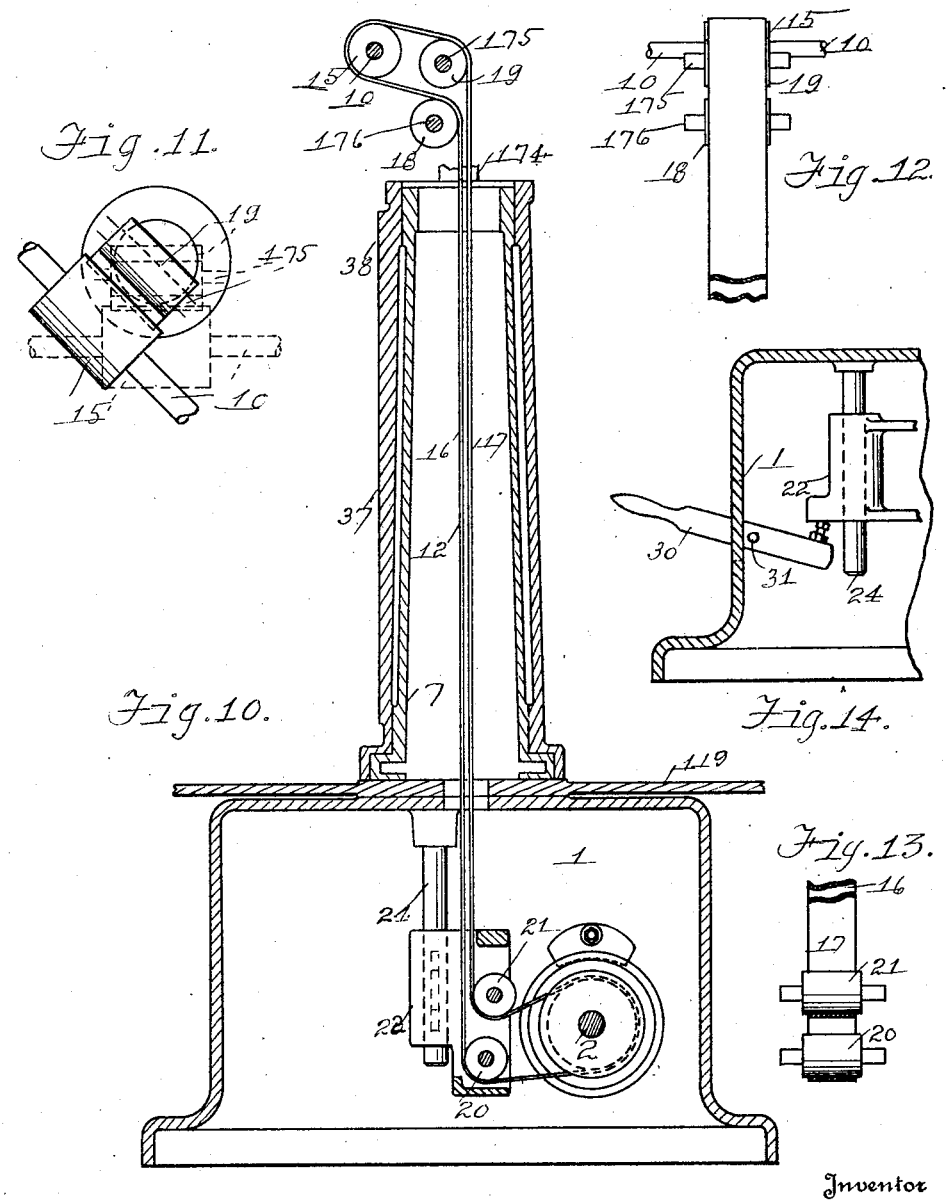

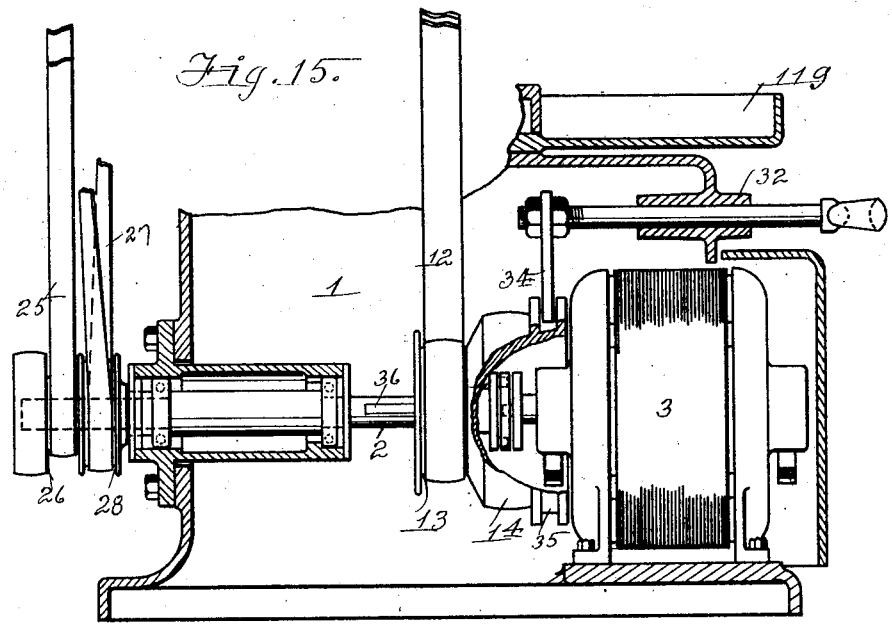
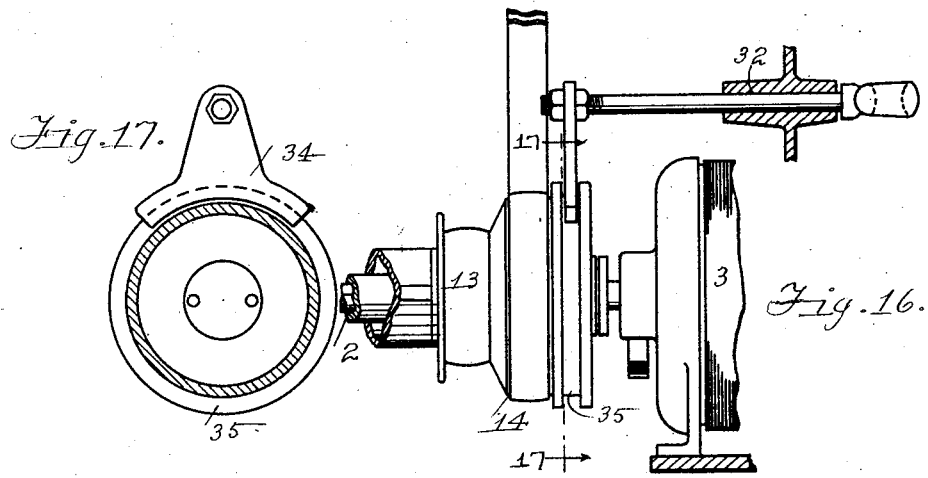

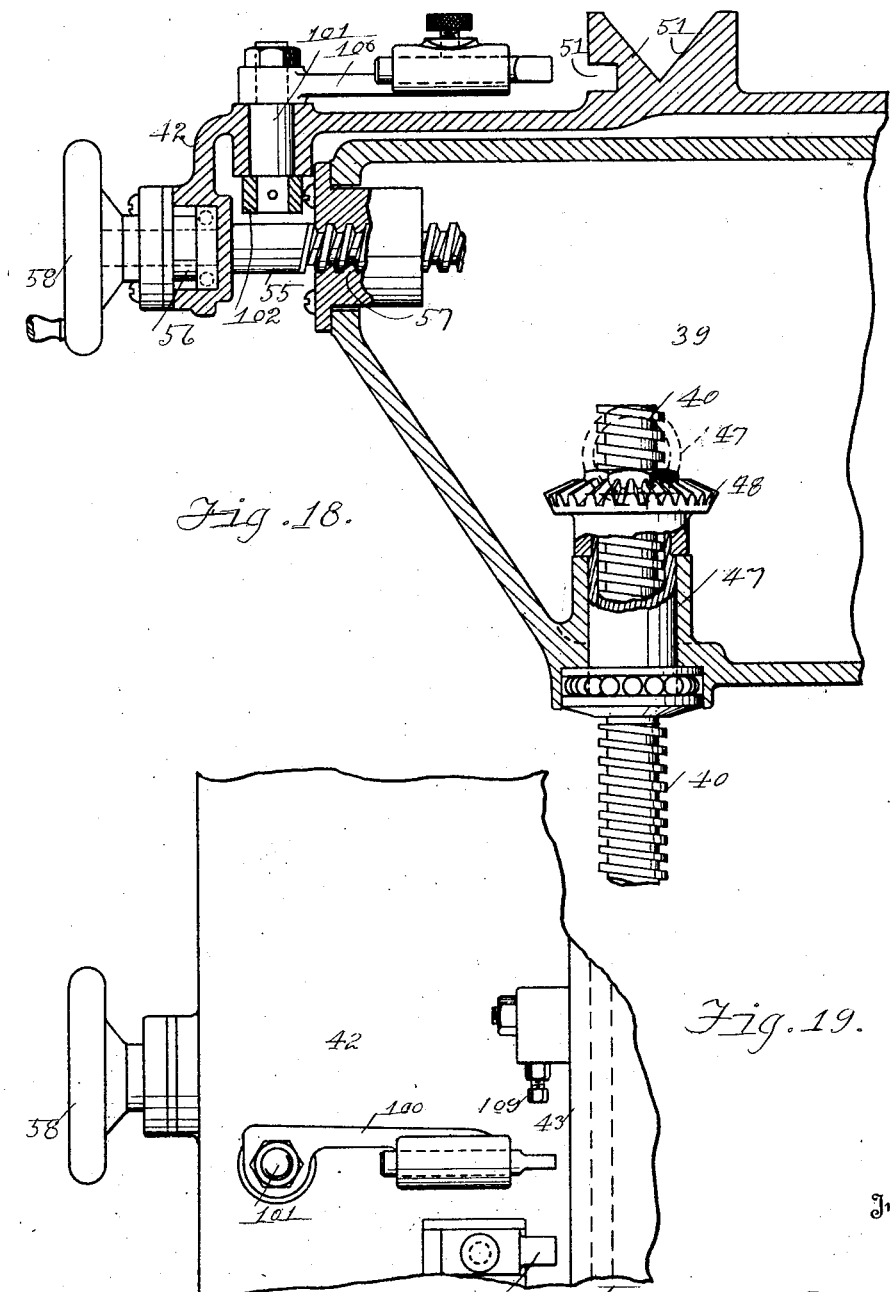

March 27, 1928.  1,664,024
J. DE KONING
GRINDING MACHINE
Filed Aug. 20, 1924  10 Sheets-Sheet 9
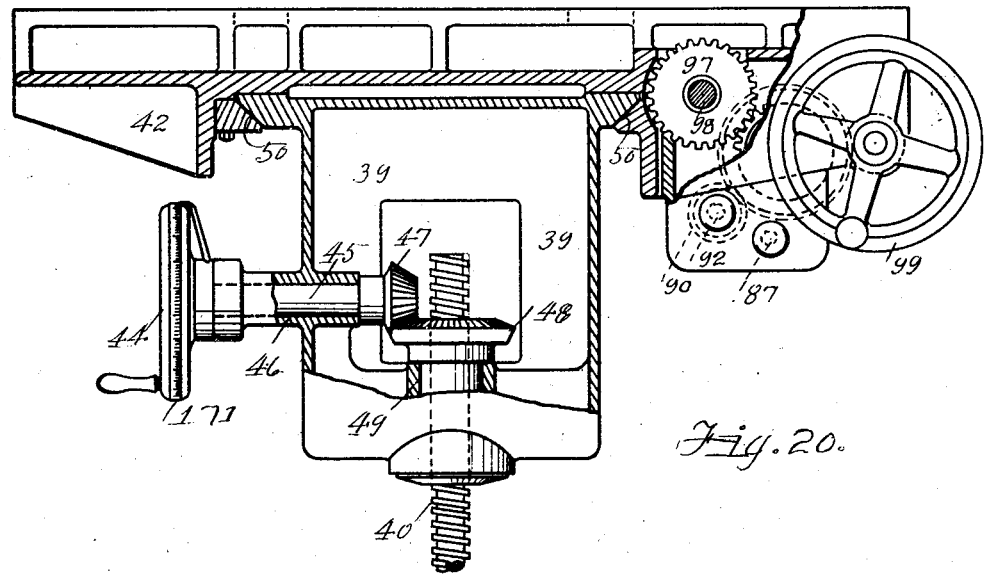
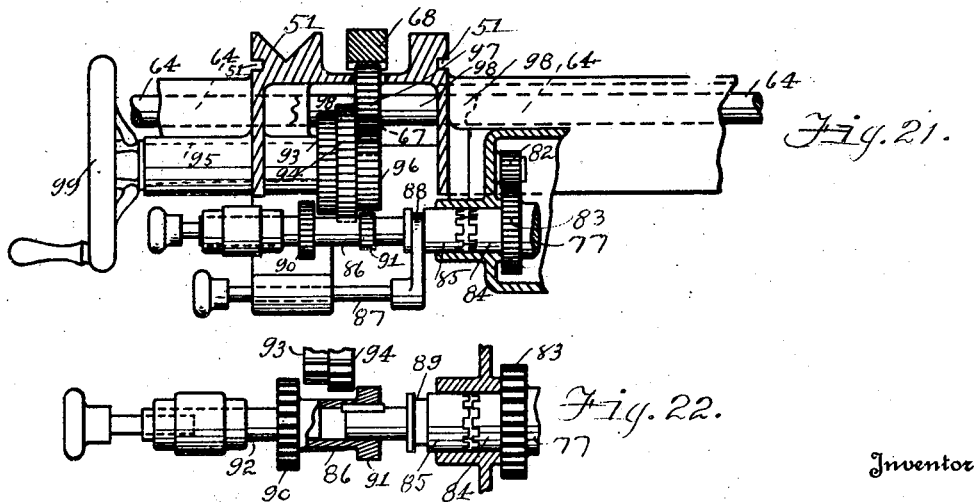
Witness:
Geo. L. Chapel
Inventor
Jacob De Koning
By Cyrus W. Rice
Attorney

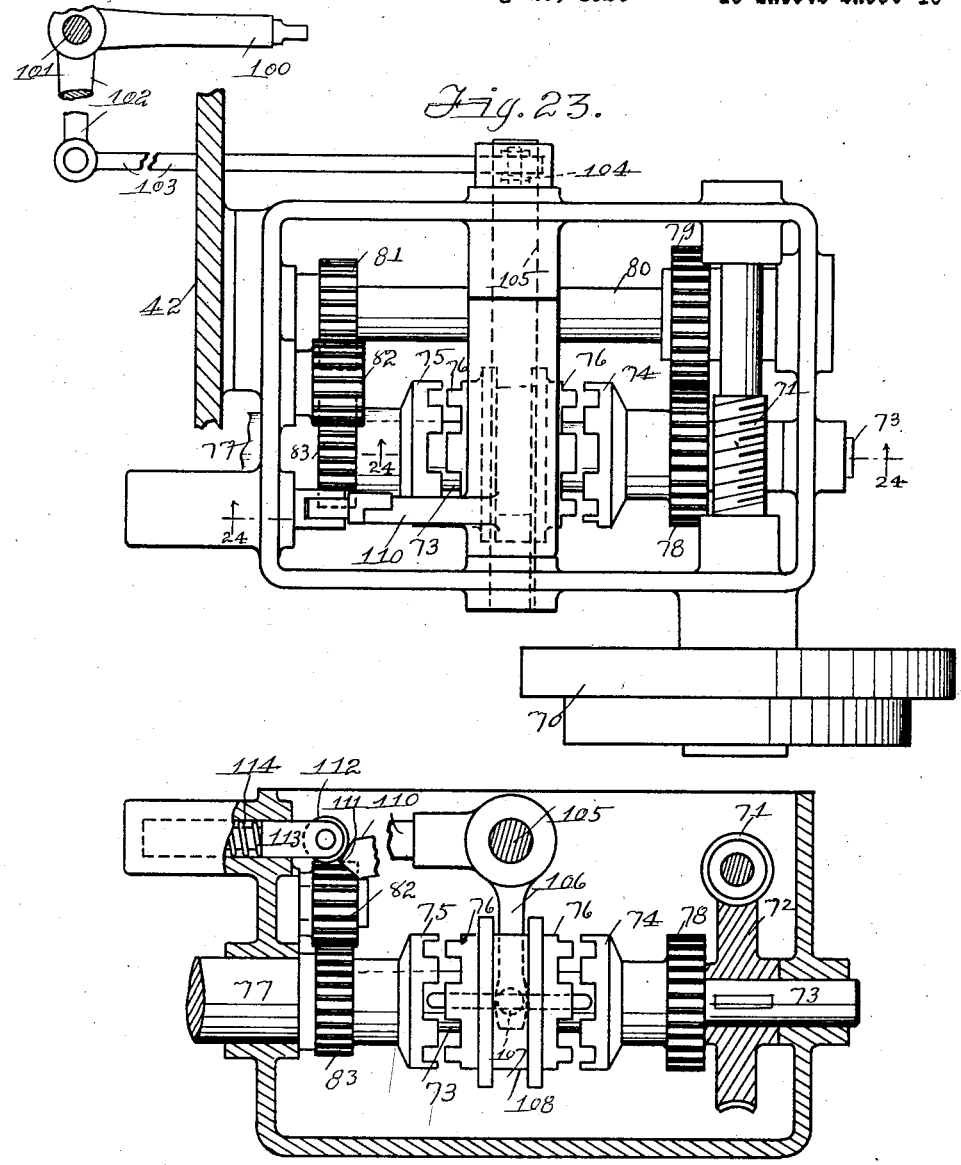

Patented Mar. 27, 1928.

1,664,024

UNITED STATES PATENT OFFICE.

JACOB DE KONING, OF GRAND RAPIDS, MICHIGAN, ASSIGNOR TO GALLMEYER AND LIVINGSTON COMPANY, OF GRAND RAPIDS, MICHIGAN, A CORPORATION OF MICHIGAN.

GRINDING MACHINE.

Application filed August 20, 1924. Serial No. 733,059.

The present invention relates to grinding machines and the like employing rotatable cutting or abrading tools; and its object is, generally, to provide such a machine improved in various respects hereinafter appearing; and more particularly, to provide a machine, of the type commonly called "universal grinding machines", having improved driving and operating mechanisms and connecting means therebetween; and further, to provide in such a machine, such operating mechanisms and connecting means compactly and conveniently disposed interrelatively; and further, to provide in such a machine, a minimum of necessary driving parts; and further, to provide in machines of this character improved belt-tightening and belt-shifting means; and further, to provide in such machines employing rotatable cutters, grinders or other tools, an improved headstock combining a live and a dead center.

These and any other objects hereinafter appearing are attained by, and the invention finds preferable embodiment in, the structure or structures hereinafter particularly described in the body of this specification and illustrated by the accompanying drawings, in which:—

Figure 4 is a central vertical sectional view of the supporting column of the machine and connected parts;

Figure 7 is a transverse sectional view of parts seen in Figure 4, taken on line 7—7 of said view;

Figure 8 is a transverse sectional view of parts shown in Figure 4 taken on line 8—8 of said figure;

Figure 9 is a sectional view of parts shown in Figure 8, taken on line 9—9 of said view;

Figure 10 is a central axial section of said column and the sleeve turning thereon and of the base supporting the column, and showing the position of certain operating parts of the machine;

Figure 11 is a top plan view of pulleys seen at the upper part of Figure 10, showing one position of said pulleys in solid lines and another position thereof in dotted lines;

Figure 12 is a view of the upper portion of the belt carried by said pulleys as seen from the right-hand side of Figure 10;

Figure 13 is a view of idler pulleys in the base of the machine as seen in Figure 10, and showing the belt carried thereby;

Figure 14 is a vertical sectional view of a portion of said base, and illustrating the vertically movable member carrying said idler pulleys;

Figure 15 is another vertical sectional view of said base, illustrating the rotatable driving means of said machine;

Figure 16 is a side view of a portion of said means, illustrating the belt-shift thereof in another position;

Figure 17 is a transverse sectional view of a portion thereof taken on line 17—17 of Figure 16;

Figure 18 is a vertical sectional view of parts of said machine taken on line 18—18 of Figure 1;

Figure 19 is a top plan view of a forward portion of the machine illustrating the lever arm which reverses the mechanism which feeds or moves the carrier of the machine;

Figure 20 is a transverse sectional view of certain parts of the machine taken on the vertical plane in which lies the axis of the screw which raises and lowers said parts and the axis of the shaft whose rotation turns the gear-nut on said screw;

Figure 21 is a transverse sectional view of parts of the machine taken on the vertical plane in which lies the axis of the shaft whose gear meshes with the rack of the carrier of said machine;

Figure 22 is a vertical axial sectional view of certain parts seen in Figure 21;

Figure 23 is a top plan view of means for feeding or moving the carrier of the machine and for reversing such feeding movement;

Figure 24 is a vertical sectional view of the same taken on line 24—24 of Figure 23;

Figure 25 is a top plan view of a headstock having an electric motor;

Figure 26 is a side view of the same, shown partly in vertical section taken on line 26—26 of Figure 25; and Figure 27 is a transverse vertical sectional view of a portion thereof taken on line 27 of Figure 26.

Figure 1:
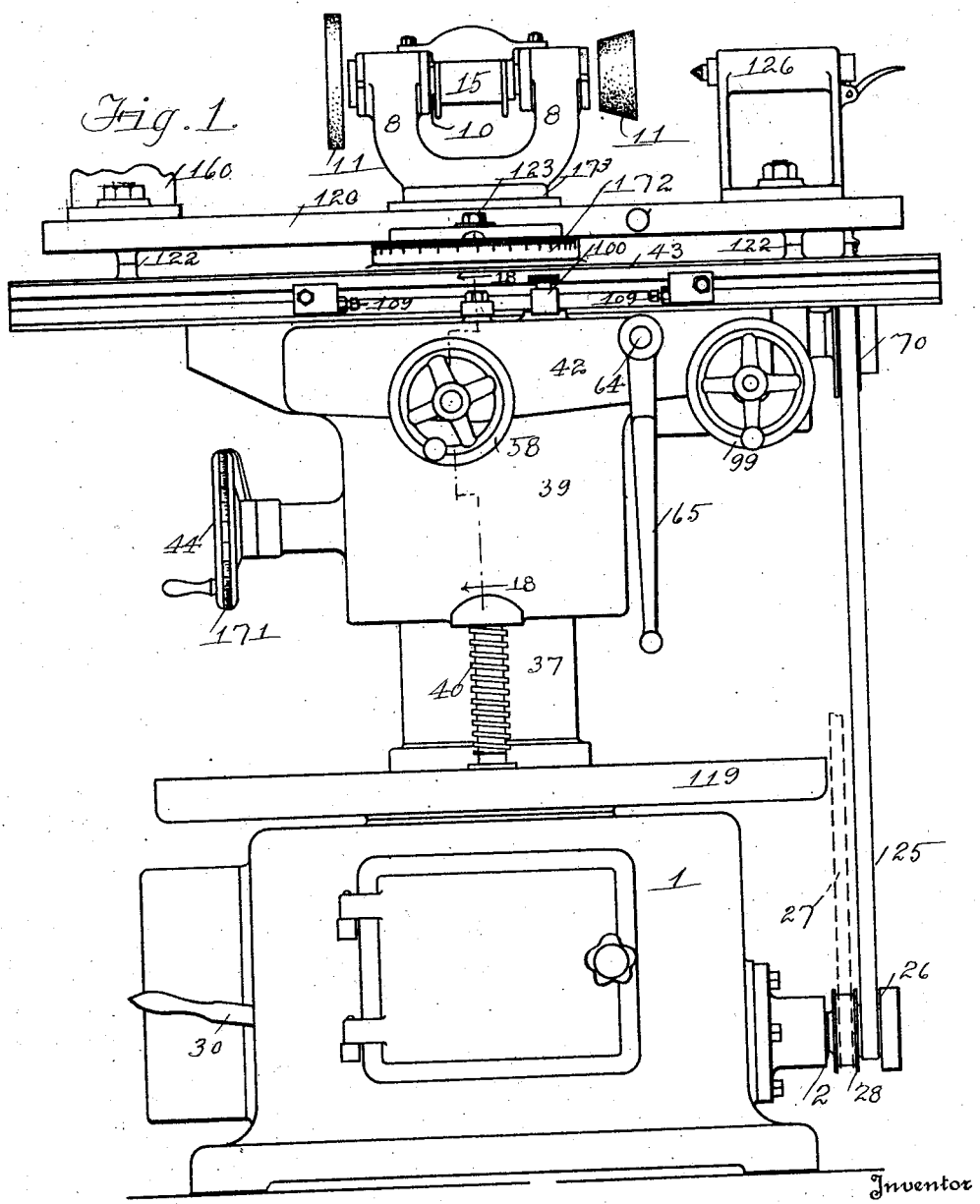
Figure 1 is a front view of a grinding machine.

In the embodiment of the invention chosen for illustration by the accompanying drawings and for detailed description in the body of this specification, a grinding machine of the type commonly called "universal grinding machines" is shown. This machine has a base 1 housing a rotatable driving element—a shaft 2—desirably rotated by an electric motor 3 in the base, whereby the mechanical movements of the various parts of the machine are effected, including the rotating of the grinding wheel or wheels, the feeding movement of the parts carrying the work, and also the operating of a pump (not shown) for cooling the work through a hose 4 having a nozzle 5. This base supports, and there is secured thereto as by bolts 6, a vertical hollow column 7 on whose upper end is mounted the arms 8 having bearings in which rotates the shaft 10 carrying the rotatable tool or grinding wheel or wheels 11. The rotatable driving element 2 rotates the grinding wheels by means of a belt 12 extending upwardly through the hollow column and carried by one or the other of the stepped portions 13, 14 of the pulley part of said element and by the pulley 15 of the grinding wheel's shaft 10, the opposite runs 16, 17 of the belt being respectively carried by the idler pulleys 18, 19 on the arms 8 and by the idler pulleys 20, 21 mounted on the member 22 having a free vertical sliding movement on a guide rod 24 in the base; while the belt 25 carried by said element's pulley 26 drives the means for feeding or moving the carrier of the machine as hereinafter explained, and the belt 27 carried by said element's pulley 28 operates the pump (not shown) for supplying cooling water to the work through the hose 4.

Figure 5:
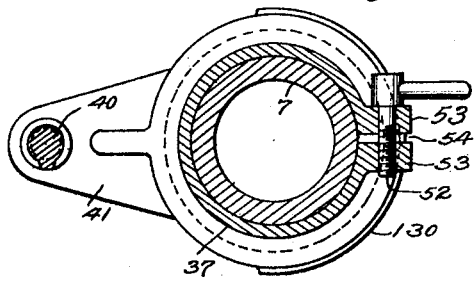
Figure 5 is a transverse sectional view of the same taken on line 5—5 of Figure 4.

It will be seen that these idler pulleys 20, 21 are so positioned that the runs of the belt 12 are deflected thereby from an approximately vertical to an approximately horizontal direction, so that the weight of the member 22 operates to tighten the belt. The said member may be raised by a lever 30 fulcrumed at 31 on the base, to permit the belt to be shifted from one of the stepped portions 13, 14 of the driving element's pulley part to the other of said portions, by a belt-shift slidable in a bearing 32 and having a fork 34 engaging in a groove 35 in said pulley part which is splined at 36 on the rotatable driving element 2. (See Figures 15 and 16.) A sleeve 37 is turnably mounted on the column 7 and has a vertical guide portion 38 in which a knee 39 is vertically movable on the sleeve, being raised by a screw 40 non-rotatably seated in an arm 41 of the sleeve. A table 42 is movable horizontally in ways 50 on the knee toward and away from the supporting column; and a carrier 43 has a movement in ways 51 on the table transverse to the table's movement. The knee is raised by rotating, as by the crank-wheel 44, a shaft 45 journalled at 46 in the knee and carrying a bevel gear 47 meshing with a bevel gear nut 48 journalled at 49 on the knee and turning on the screw 40 (see Figure 20). The sleeve 37 may be clamped in non-turnable relation to the column by a screw 52 journalled in one and threaded in the other of a pair of lugs 53 on opposite sides of the split lower portion 54 of the sleeve (see Figure 5).

The table 42 is moved in the ways 50 by a shaft 55 journalled at 56 in the table and threaded at 57 in the knee and turned by a crank wheel 58 (see Figure 18). This crank wheel is at the front of the machine, and to enable the operator to thus move the table from the rear thereof, a shaft 59 is journalled in the table having a crank wheel 60 at its rear end. A sprocket chain 61 is carried by sprocket wheels 62, 63 on the shafts 59 and 55 respectively (see Figure 3).

Figure 3:
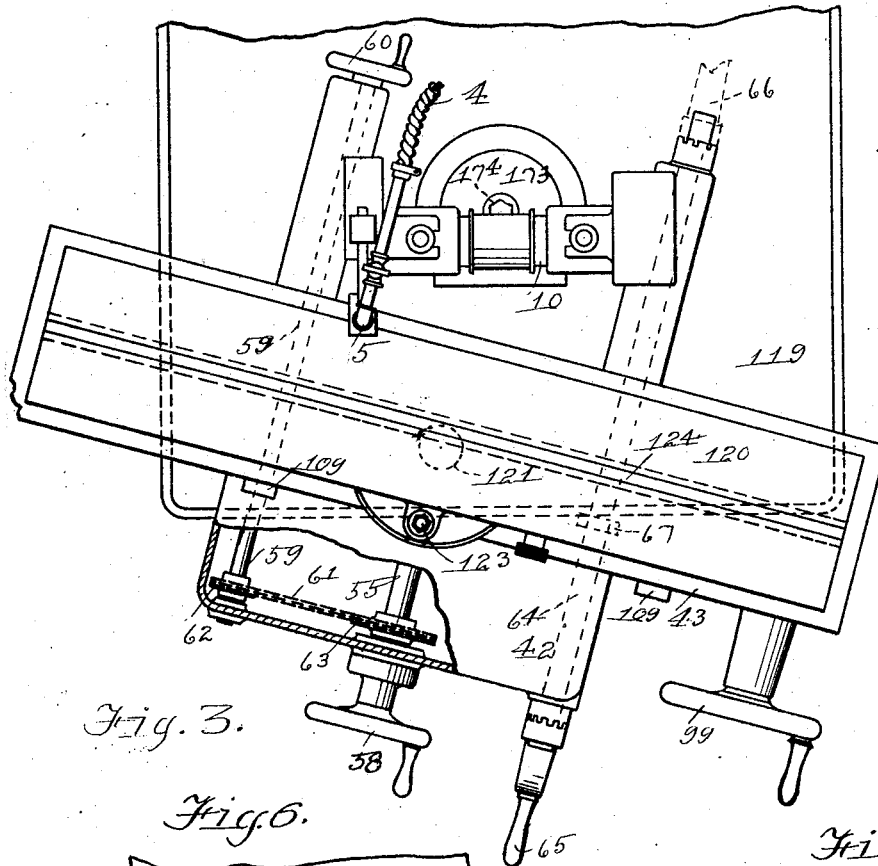
Figure 3 is a top plan view of the same, but showing certain parts in another position.
Figure 6:
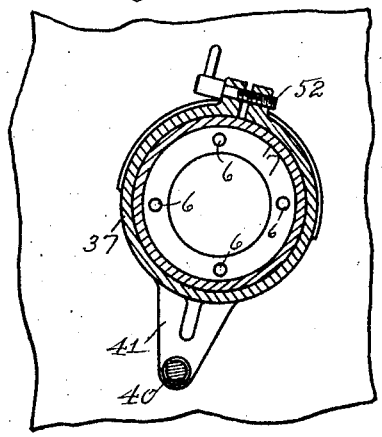
Figure 6 is a like sectional view of the parts seen in Figure 5, but showing the same in another interrelative position.

The carrier 43 may be moved manually on the ways 51 by turning the shaft 64 journalled on the table and turnable by its detachable cranks 65, 66 on its opposite ends (at the front and rear of the machine respectively) this shaft having a gear 67 meshing with the rack 68 on the under side of the carrier (see Figures 3 and 21). The carrier 43 may also be moved on the ways 51 automatically, i. e., fed, by means of the following mechanism: The belt 25 is carried by and drives the pulley 70, whose worm shaft 71 journalled on the table 42 meshes with the worm wheel 72 keyed on the shaft 73. Either of the clutch members 74, turning freely about said shaft, or 75 keyed to the alined shaft 77, is adapted to be engaged by the intermediate clutch member 76 splined on shaft 73. When the clutch member 75 is thus engaged, the alined shaft 77 is rotated; when however the clutch member 74 is engaged by the intermediate clutch member 76, the gear 78 integral with member 74 and meshing with gear 79 on the short shaft 80 rotates the shaft 77 in the opposite direction through the gear 81 on shaft 80, the idler gear 82 and the gear 83 keyed on said shaft 77. (See Figures 23 and 24.)

A manually operated clutch and change-speed gearing are shown in Figures 21 and 22, comprising: The clutch members 84, 85, the former being keyed to shaft 77 and the latter splined to an alined shaft 86, are moved into and out of engagement by the slide rod 87 carrying a fork 88 engaging in the groove 89 of member 85. When engaged, these clutch members rotate said alined shaft 86 which carries change-speed gears 90, 91 adapted to mesh, by sliding the shaft 86 in its bearing 92, either of the change-speed gears 93 or 94 on the shaft 95 carrying a gear 96 meshing with a gear 97 on a shaft 98 and meshing with the carrier's rack 68. The shaft 95 may be manually turned by its crank wheel 99 to move the carrier 43. The feeding movement of the carrier is automatically reversed by the following mechanism: Swingably mounted on the table 42 is a lever arm 100 (Figures 19 and 23) whose fulcrum shaft 101 carries the arm 102. A link 103 is connected to this arm 102 and to a depending arm indicated at 104 on the shaft 105 whose other depending arm 106 has a lug 107 engaging in the groove 108 of the intermediate clutch member 76 (see Figures 23 and 24), so that the swinging of the lever arm 100 by a lug 109 mounted on the carrier shifts this intermediate clutch member by the movement of the carrier. The intermediate clutch member 76 is held in one or the other clutch engagement by an arm 110, on the shaft 105, engaging at its reversely-bevelled end 111 a roll 112 carried by a plunger 113 pressed outwardly by a spring 114 (see Figures 23 and 24). A stop for limiting the movement of the carrier when manually moved is shown at 115.

Figure 2:
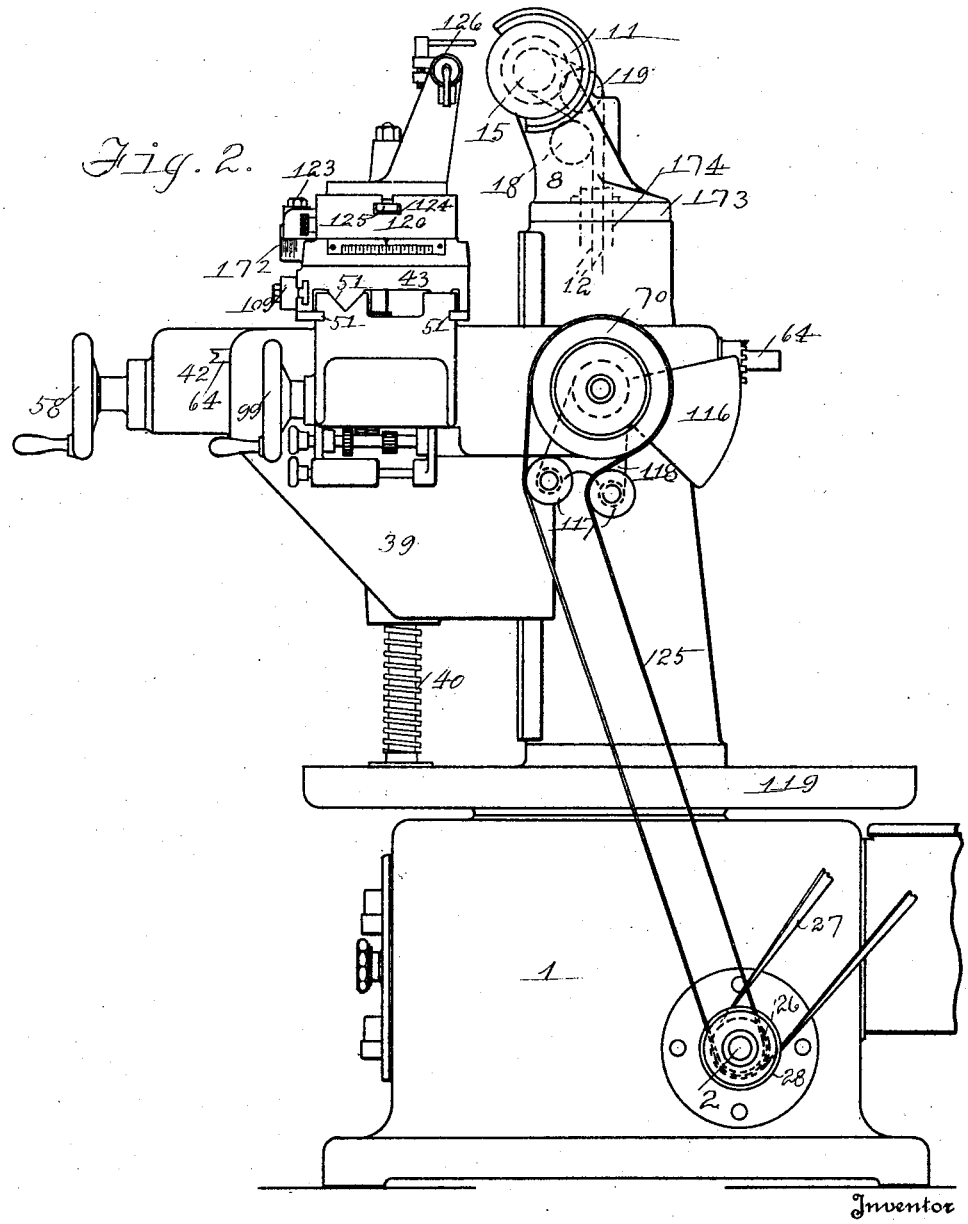
Figure 2 is a right-hand end view thereof.

In Figure 2, a belt-tightener for the belt 25 is shown consisting of a bell-crank lever fulcrumed concentrically with the pulley 70 and having a horizontal weight arm 116 and idler pulleys 117 mounted on its other arm 118.

An oil drip pan is shown at 119 formed on or carried on the base 1. A platform 120 is pivotally mounted at 121 on the carrier 43 to swing in a horizontal plane on the side bearings 122, being held in adjustment by a screw 123. This platform, supported as it is by the sleeve 37, knee 39, table 42 and carrier 43, in turn supports the work to be ground, this platform having an inverted T-shaped groove 124 extending in its longitudinal direction and adapted to receive and hold the correspondingly shaped foot-portions 125 of the work-holders. These work-holders may be of various kinds adapted to the workpieces to be held thereby and the character of the operations to be performed thereon. A tailstock is shown at 126 and a headstock may be mounted adjacent the opposite end of said platform. In Figures 25, 26 and 27 a headstock is illustrated adapted to be secured to the platform 120 in the position indicated in Figure 1. This headstock comprises a shaft 130 bored to tightly hold a tapered piece 131 having a "center" 161 adapted to support a work-piece, indicated at 132, rotatably about said center, and held on a mandrel 162. This shaft is rotatably mounted in a bearing 133 in the body 160 of the headstock and has keyed thereto a radial flange 134. An annular member 135 is turnable on the shaft concentrically therewith and has means, as the pin 136, for engaging work-rotating means, as the dog or clamp 137 secured to the work. An element, the gear 138, is turnably mounted on the shaft 130 concentrically therewith. Coupling means are provided for connecting the shaft 130 (by its flange 134), said member 135 and said gear element 138 to rotate together, and to also connect only said member 135 and said element 138 to rotate together, such means comprising a bolt 139 slidable through holes 140, 141 and 142 in said member, said element and said flange respectively, in which position the work 132 is rotated by suitable means, as the gear 143 meshing with the gear element 138. Or, the bolt 139 may be slid outwardly out of the hole 142 in the shaft's flange 134 but engaging in the holes of member 135 and element 138 only, in which position of this bolt the work is rotated about the center 161 which is now a "dead" center.

In this second position of this bolt 139, a pin or bolt 144 slidable in a hole 145 in the body of the headstock is slid into said hole 142 in the shaft's flange 134 to hold the shaft from rotation. The bolt 139 and the pin or bolt 144 may be connected to move together into one position or the other by a yoke indicated at 146 in dotted lines. The gear element 138 may comprise a pair of gears 138 and 147, one or the other of which may be brought into mesh with the change-speed gears 143 or 148 splined on the shaft 165 and shifted by a sliding rod 149 carrying a fork 150 engaging the sides of the gear 148. The gear element 138 may be driven by any suitable means, as by an electric motor 151 carried by the headstock and having a gear 152 meshing with the gear 153 on the shaft 165.

It will be seen that this headstock is adapted for use on lathes, and the like as well as grinding machines.

The arms 8 supporting the shaft 10 of the grinding wheel 11 extend upwardly from a head 173 mounted on the column turnably in a horizontal plane about an axis 174. The idler pulleys 18, 19 are mounted on the head rotatably on horizontal axes 175, 176 and carry the runs 17, 16 of the belt 12. It will thus be seen that the head 173 may be turned to swing the grinding wheel, and the axes 10, 175 and 176 to various positions as indicated in Figure 11, the belt 12 thus twisting accordingly. Graduated circles are shown at 170, 171, 172 and 177 for indicating angular adjustments.

The invention being intended to be pointed out in the claims, is not to be limited to or by details of construction of the particular embodiment thereof illustrated by the drawings or hereinbefore described.

I claim:

1. In a machine of the character described: a hollow column; a tool rotatably mounted on the column and having an operating pulley; a rotatable driving element having a pulley below the first-mentioned pulley; a sleeve turnably mounted around the column; a knee having a vertical movement on the sleeve; a table having a movement on the knee toward and away from the column; a work-supporting carrier having a movement on the table transverse to the table's movement and having a rack; a shaft rotatably mounted on the table and carrying a gear meshing with the rack and having a sprocket wheel and a crank at one side of the machine; a shaft rotatably mounted on the table parallelly with the first-mentioned shaft and having a sprocket wheel and a crank on the opposite side of the machine; a chain on the sprocket wheels; a belt carried by said pulleys and extending in the hollow column.

2. In a machine of the character described: a hollow column; a tool rotatably mounted on the column and having an operating pulley; a driving pulley below the first-mentioned pulley; a sleeve turnably mounted around the column; a knee having a vertical movement on the sleeve; a table having a movement on the knee toward and away from the column; a work-supporting carrier having a movement on the table transverse to the table's movement; a shaft rotatably mounted on the table and having a crank at one side of the machine; means for moving the carrier by the rotative movement of said shaft; a shaft rotatably mounted on the table and having a crank on the opposite side of the machine; means for rotating one of the shafts by the rotative movement of the other shaft; a belt carried by the pulleys and extending in the hollow column.

In testimony whereof I have hereunto set my hand at Grand Rapids, Michigan, this 18th day of August, 1924.

JACOB DE KONING.